(12) United States Patent
Chao et al.

(10) Patent No.: US 7,940,461 B2
(45) Date of Patent: May 10, 2011

(54) OPTICAL DIFFUSION MODULE

(75) Inventors: Chih-Chiang Chao, Taipei (TW);
Po-Ling Shiao, Hsinchu (TW); Yu-Tsan Tseng, Taoyuan County (TW);
Cheng-Hsuan Lin, Changhua County (TW); Mei Chun Lai, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 114 days.

(21) Appl. No.: 11/674,064

(22) Filed: Feb. 12, 2007

(65) Prior Publication Data

US 2008/0037947 A1    Feb. 14, 2008

(30) Foreign Application Priority Data

Aug. 14, 2006  (TW) ................. 95129762 A

(51) Int. Cl.
*G02B 5/02*    (2006.01)
*G02B 13/20*   (2006.01)
*G02F 1/1335*  (2006.01)

(52) U.S. Cl. ............... 359/599; 349/64; 349/112
(58) Field of Classification Search .............. 359/599; 349/64, 112
See application file for complete search history.

(56) References Cited

U.S. PATENT DOCUMENTS

| 5,584,556 A * | 12/1996 | Yokoyama et al. ........... 362/625 |
| 5,933,276 A | 8/1999 | Magee |
| 5,995,288 A * | 11/1999 | Kashima et al. ............. 359/599 |
| 7,489,373 B2 * | 2/2009 | Kim ............................ 349/64 |
| 7,656,584 B2 * | 2/2010 | Chao et al. ................... 359/625 |
| 7,711,223 B2 * | 5/2010 | Chao et al. ..................... 385/37 |
| 7,789,548 B2 * | 9/2010 | Chao et al. ................... 362/619 |
| 2009/0091837 A1 * | 4/2009 | Chao et al. .................. 359/599 |
| 2010/0053954 A1 * | 3/2010 | Chao et al. ................... 362/235 |
| 2010/0264555 A1 * | 10/2010 | Chao et al. ................... 264/1.37 |

FOREIGN PATENT DOCUMENTS

| CN | 1641432 A | 7/2005 |
| CN | 1727952 | 2/2006 |
| CN | 1760724 A | 4/2006 |
| JP | 2003-262706 | 9/2003 |
| JP | 2006-154252 | 6/2006 |
| TW | I252344 | 4/2006 |
| TW | 200613844 | 5/2006 |

OTHER PUBLICATIONS

China Patent Office, Office Action, Patent Application Serial No. 200610125696.6, Feb. 11, 2011, China.

* cited by examiner

*Primary Examiner* — Uyen-Chau N Le
*Assistant Examiner* — John M Bedtelyon

(57) ABSTRACT

An optical diffusion module comprises a first diffusion structure comprising a plurality of convex portions and a plurality of concave portions arranged alternatingly, and a second diffusion structure comprising a plurality of convex portions and a plurality of concave portions arranged alternatingly. Light from a light source passes through the first diffusion structure and the second diffusion structure sequentially, and each convex portion is adjacent to a plurality of concave portions and each concave portion is adjacent to a plurality of convex portions, and the convex portions, the concave portions and each junction of the convex and concave portions have a curvature different from 0.

21 Claims, 13 Drawing Sheets

OPTICAL DIFFUSION MODULE

BACKGROUND OF THE INVENTION

1. Field of the Invention

The invention relates to optical diffusion, and in particular to an optical diffusion structure with an array of convex portions and concave portions alternatingly arranged.

2. Description of the Related Art

Light emitting diodes, rather than CCFLs, are applied in backlight modules due to low cost and simplified structure. To keep the light source uniform, an optical diffusion structure is used. For point light source or linear light sources, the diffusion structure is usually designed to diffuse light in one or two dimensions.

A conventional backlight module employs a diffusion plate which has a blurred structure, a grained structure or micro-lens array. The blurred structure causes intensity reduction. The grained structure has small diffusion angle and cannot easily control diffusion directions. The micro-lens array operates at high intensity and is able to control the diffusion direction. The methods of manufacturing micro-lens array comprise mechanical methods, thermal fusion methods, or other complex methods, wherein a laser dragging method is generally used.

A laser dragging method is shown in FIG. 1a. A laser beam B passes through a mask 5 and reaches a substrate 10. When the mask 5 moves in a direction L7, the laser beam etches the substrate 10 to form grooves 12 which constitute a micro-lens array. A sharp corner with curvature equal to zero is formed between two grooves 12. The factors for controlling laser dragging comprise dragging speed, laser power, and number of repeated operations, which affect the depth of the grooves 12. The profile of the micro-lens array, however, depends on the pattern of the mask. Referring to FIG. 1b, a pattern M3 with large openings and small openings is formed on a mask M30. The mask M30 is applied to the laser dragging method to form a plurality of first micro-lenses 202 (concave portions) and a second micro-lens (convex portions) 204 arranged alternatingly. The area of the openings determines the etching depth. An ellipse array pattern or circle array pattern can be applied.

FIG. 2a depicts an optical diffusion structure 200 manufactured by the mask M3 in FIG. 1b along with a diffusion plate 50. FIG. 2b depicts the intensity of light passing through the optical diffusion structure 200. The stripes in FIG. 2b represent the area where light is condensed. Number 30 represents LED array. FIG. 2c depicts a blurred structure 210 formed on the back of the optical diffusion structure 200 for enhanced light diffusion.

BRIEF SUMMARY OF INVENTION

An optical diffusion structure of the invention comprises a plurality of convex portions and a plurality of concave portions. Each convex portion is adjacent to a plurality of concave portions and each concave portion is adjacent to a plurality of convex portions. The convex portions, the concave portions and each junction of the convex and concave portions have a curvature other than 0.

An embodiment of the optical diffusion structure of the invention comprises a first diffusion structure comprising a plurality of convex portions and a plurality of concave portions arranged alternatingly, a second diffusion structure comprising a plurality of convex portions and a plurality of concave portions arranged alternatingly. Light from a light source passes through the first diffusion structure and the second diffusion structure sequentially.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2b is an intensity diagram of the optical diffusion structure of FIG. 2a;

FIG. 3b is an enlarged view of region A of FIG. 3a;

FIG. 4b is an enlarged view of region B of FIG. 4a;

FIG. 5a depicts an application of the optical diffusion structure of FIG. 3a;

FIG. 5b is an intensity diagram of the optical diffusion structure of FIG. 5a;

FIG. 5c depicts a blurred structure formed on the back of the optical diffusion structure of FIG. 5a;

FIG. 6a depicts an application of the optical diffusion structure of FIG. 4a;

FIG. 6b is an intensity diagram of the optical diffusion structure of FIG. 6a;

FIG. 6c depicts a blurred structure formed on the back of the optical diffusion structure of FIG. 6a;

FIG. 7b is an intensity diagram of the optical diffusion structure of FIG. 7a;

FIG. 7c depicts a blurred structure formed on the back of the optical diffusion structure of FIG. 7a;

FIG. 8b is an intensity diagram of the optical diffusion structure of FIG. 8a;

FIG. 8c depicts a blurred structure formed on the back of the optical diffusion structure of FIG. 8a;

FIG. 9b is an intensity diagram of the optical diffusion structure of FIG. 9a;

FIG. 9c depicts a blurred structure formed on the back of the optical diffusion structure of FIG. 9a;

DETAILED DESCRIPTION OF INVENTION

The invention discloses a two-dimensional optical diffusion structure for two-dimensional light diffusion. The optical diffusion structure of the invention is formed by a laser dragging method.

Figure 1A:
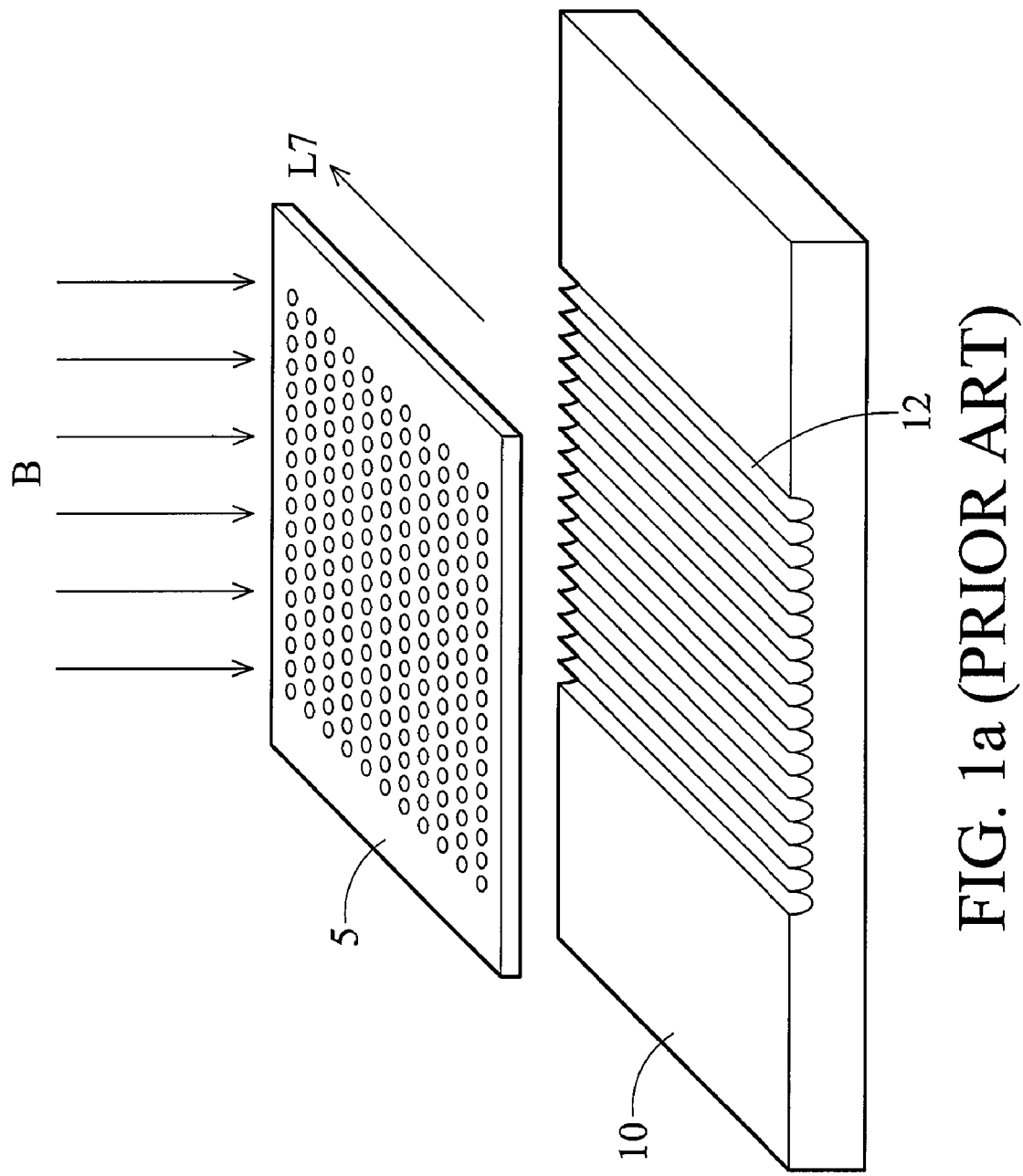
FIG. 1a is a schematic view of an optical diffusion structure manufactured by laser dragging.
Figure 1B:
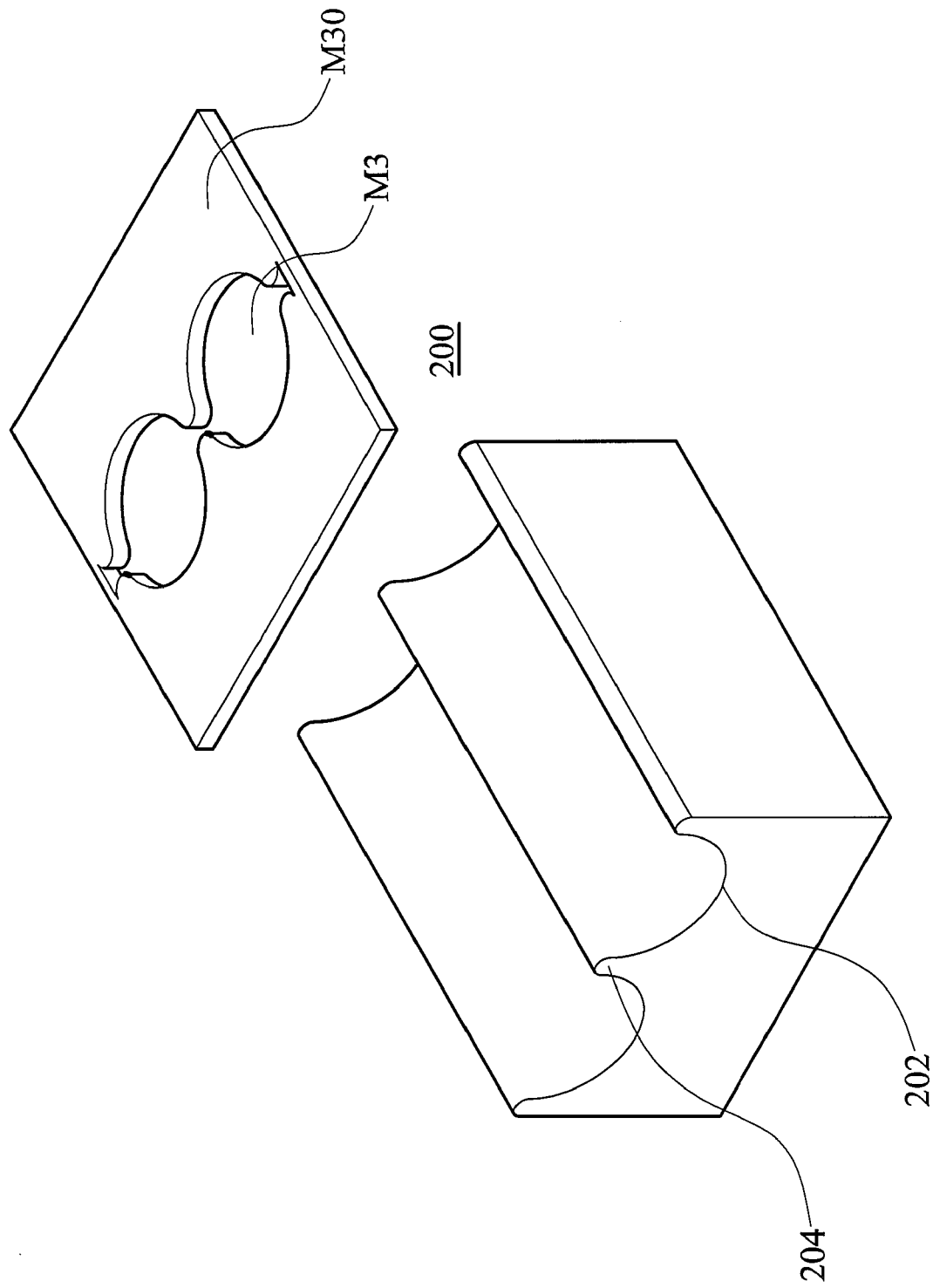
FIG. 1b depicts a mask used in the laser dragging method and an optical diffusion structure manufactured by the mask.
Figure 2A:
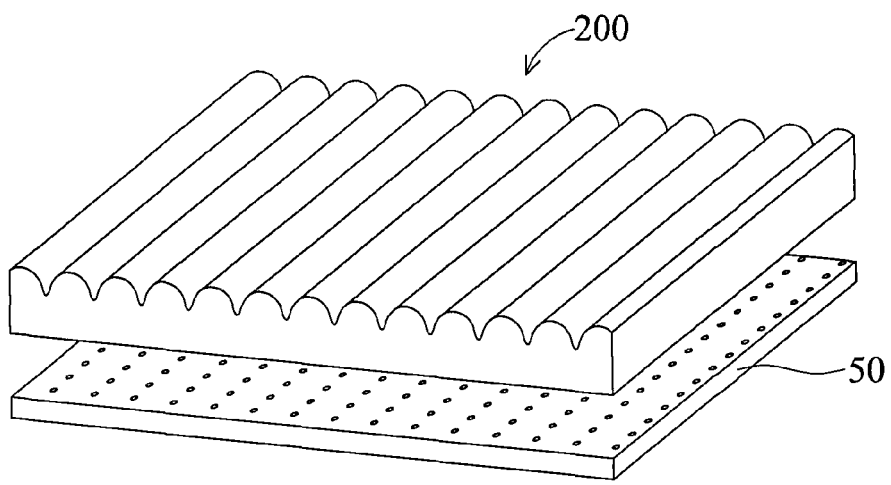
FIG. 2a depicts an application of the optical diffusion structure of FIG. 1b.
Figure 2B:
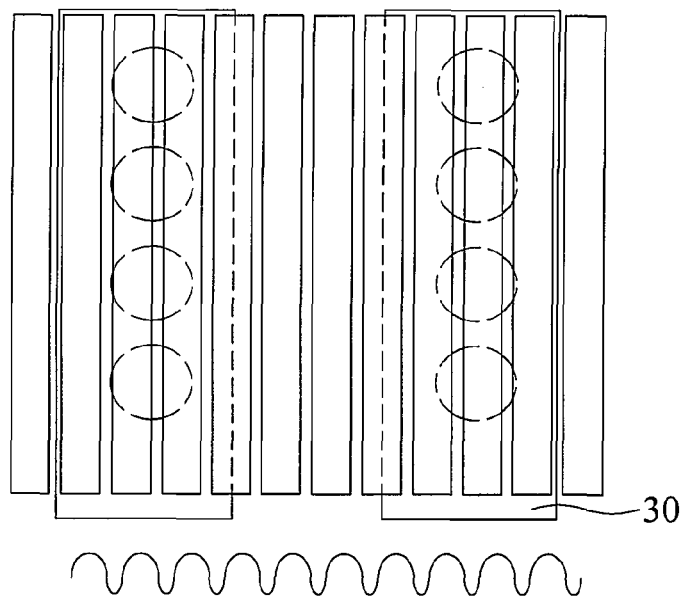
Figure 2C:
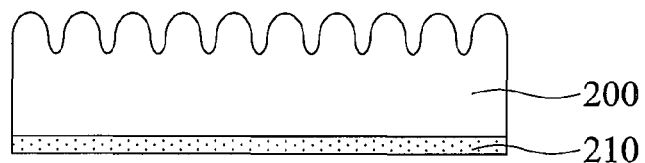
FIG. 2c depicts a blurred structure formed on the back of the optical diffusion structure.

As mentioned in conventional technology, a one-dimensional optical diffusion structure is formed by laser dragging. In FIG. 2a, the convex portions or the concave portions are the same size. Nevertheless, in the following embodiments, an optical diffusion structure with convex portions or concave portions of different sizes is disclosed. Such an optical diffusion structure generates highly uniform light intensity. For example, larger convex portions or concave portions with large diffusion angle can be disposed above the light source, and smaller convex portions or concave portions with small diffusion angle can be disposed in the space between two light sources.

Figure 3A:
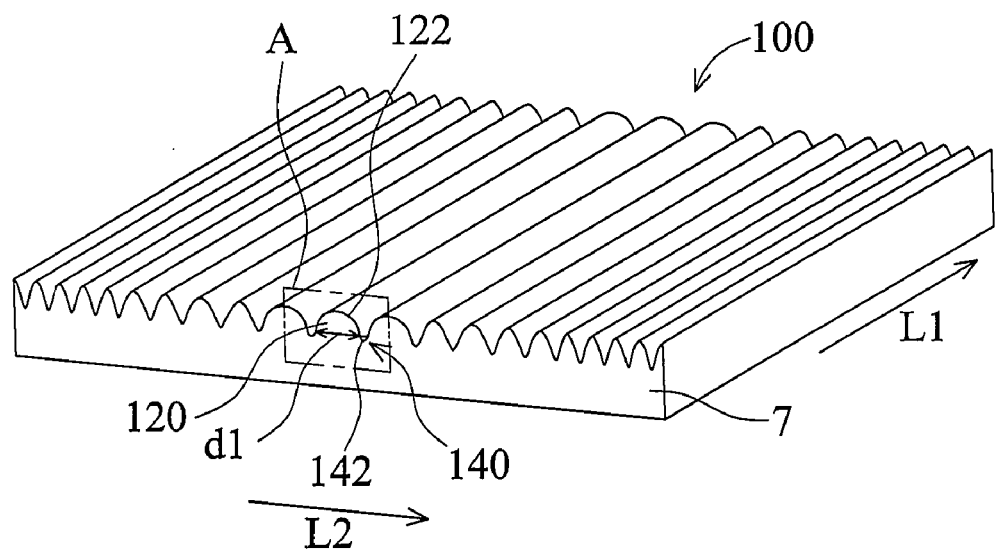
FIG. 3a is a schematic view of another embodiment of the optical diffusion structure of the invention.

Referring to FIG. 3a, an optical diffusion module comprises an optical diffusion structure 100 and a diffusion plate 7. The optical diffusion structure 100 formed on the diffusion plate 7 by laser dragging comprises a plurality of convex portions 120 having a first surface 122 and a plurality of concave portions 140 having a second surface 142. The convex portions 120 and the concave portions 140 extend along a first direction L1 and are arranged alternatively along a second direction L2. In this embodiment, the first direction L1 is perpendicular to the second direction L2.

Figure 3B:
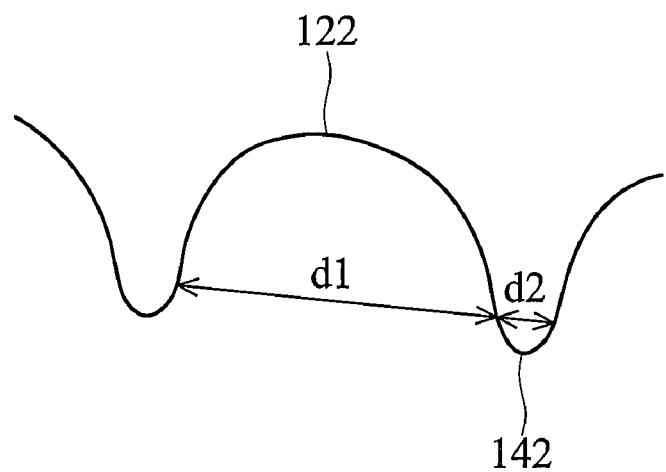

FIG. 3b is an enlarged view of region A of FIG. 3a. The first surface 122 is connected to the second surface 142, and curvature of the junction of the first surface 122 and the second surface 142 is different from 0. A first width d1 is defined as the width of the convex portion 120, the width of the first surface 122 along the second direction L2. A second width d2 is defined as the width of the concave portion 140, the width of the second surface 142 along the second direction L2. The first width d1 and the second width d2 represent the width of the profile of the convex portion 120 and the concave portion 140. In FIG. 3a, the first width d1 and the second width d2 decrease from center to lateral sides.

Figure 3C:
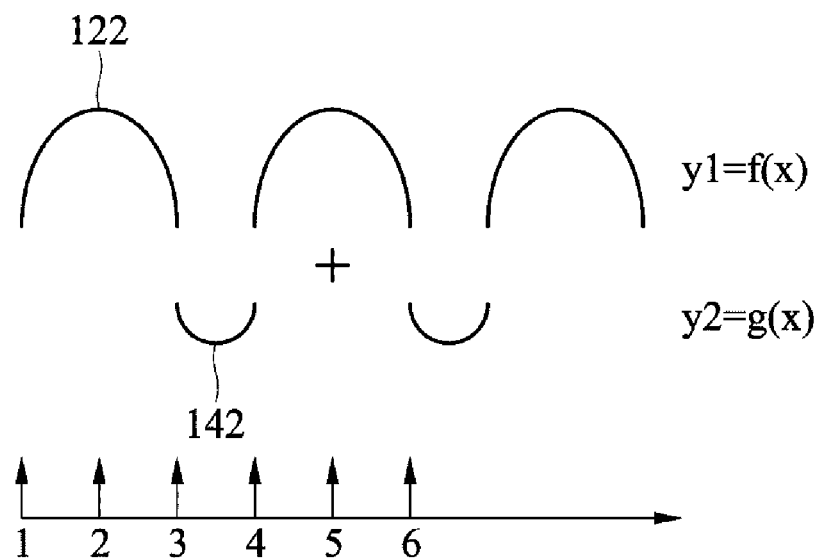
FIGS. 3c and 3d depicts the curvature of the junction of the convex portions and the concave portions.
Figure 3D:
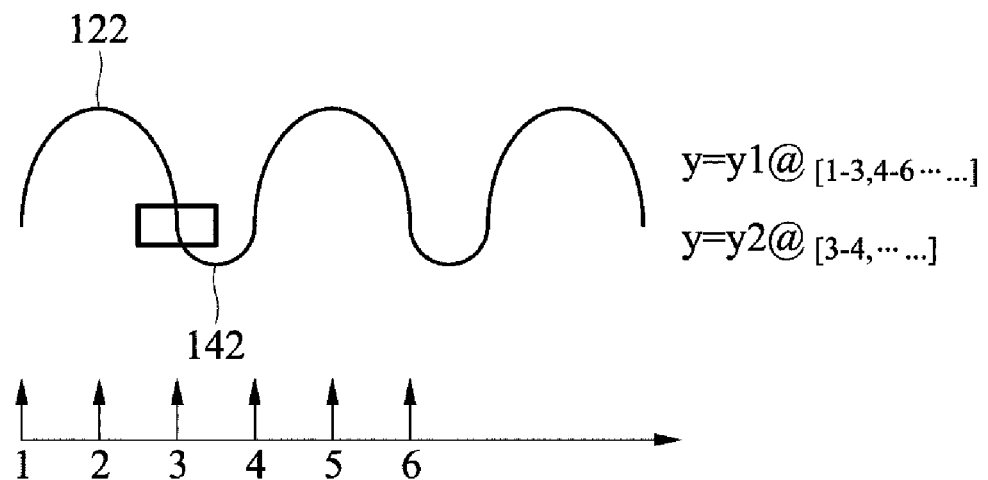

Referring to FIGS. 3c and 3d, the profile of the first surface 122 and the second surface 142 can be defined as the combination of two functions. For example, the first surface 122 (convex portion) is defined by y1=f(x) and the second surface 142 (concave portion) is defined by y2=g(x). The curvature of f(x) is given by the equation $k=y''/(1+y'^2)^{3/2}$. For such a curve, by selecting appropriate functions f(x) and g(x) and intervals for y1 and y2, the curvature at the junctions between the convex portion and the concave portion (for example, where position=3, 4, 6) is not equal to 0. For example, in the illustrated curve, there is no mathematical necessity that $f''(x)/(1+f'(x)^2)^{3/2}$ and or $g''(x)/(1+g'(x)^2)^{3/2}=0$ where position=3. For such a curve, the junctions between the convex and concave portions are transition points where the curvature switches direction (from positive to negative or vice versa), but the curvature itself need never equal to 0.

Figure 4A:
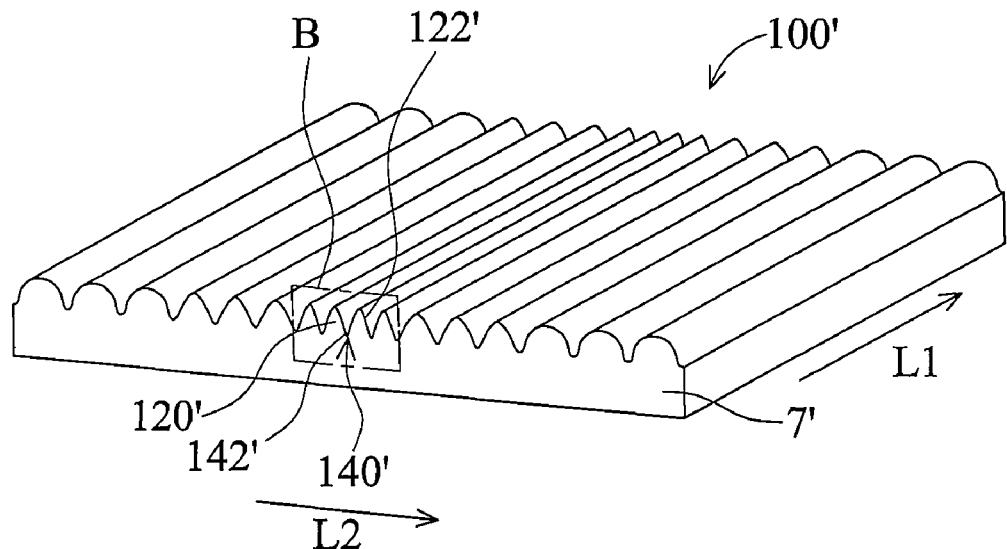
FIG. 4a is a schematic view of another embodiment of the optical diffusion structure of the invention.

FIG. 4a shows another embodiment of the optical diffusion structure. The optical diffusion structure 100' comprises a plurality of convex portions 120' having a first surface 122' and a plurality of concave portions 140' having a second surface 142'. The convex portions 120' and the concave portions 140' extend along a first direction L1 and are arranged alternatively along a second direction L2. In this embodiment, the first direction L1 is perpendicular to the second direction L2.

Figure 4B:
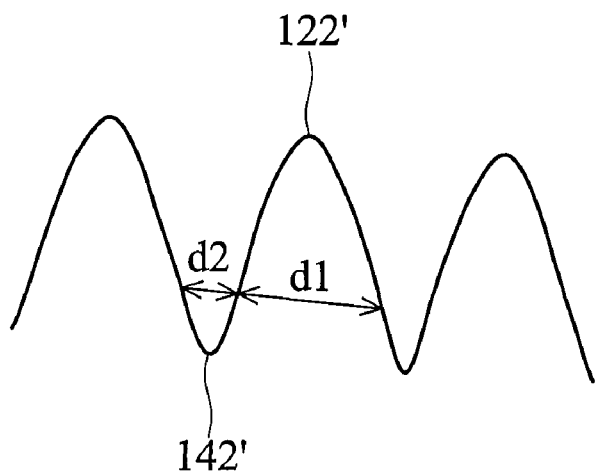

FIG. 4b is an enlarged view of region B of FIG. 4a. The first surface 122' is connected to the second surface 142', and curvature of the junction of the first surface 122' and the second surface 142' is different from 0. A first width d1 is defined as the width of the convex portion 120', the width of the first surface 122' along the second direction L2. A second width d2 is defined as the width of the concave portion 140', the width of the second surface 142' along the second direction L2. The first width d1 and the second width d2 represent the width of the profile of the convex portion 120 and the concave portion 140. In FIG. 4a, the first width d1 and the second width d2 increase from the center to lateral sides.

Figure 5A:
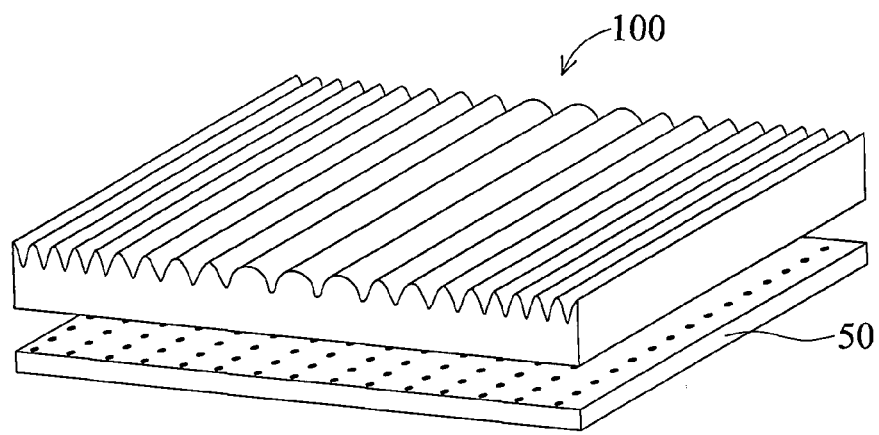
Figure 5B:
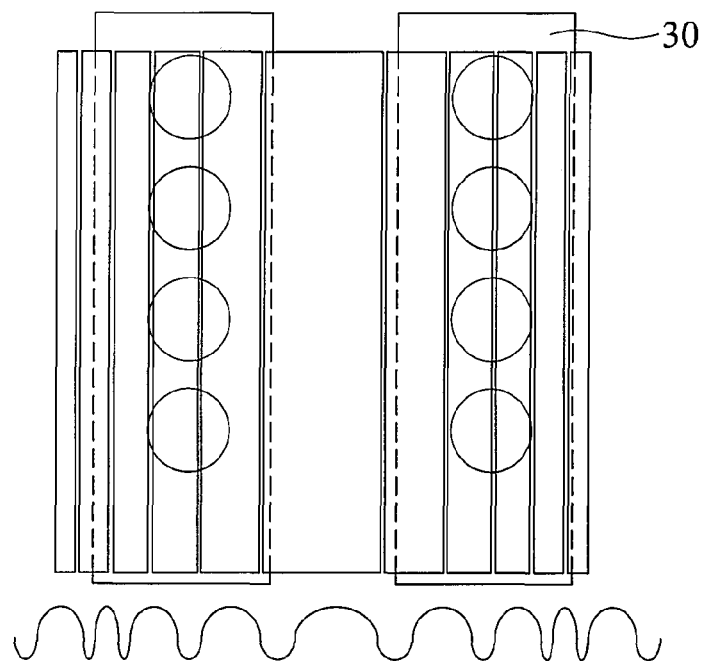
Figure 5C:
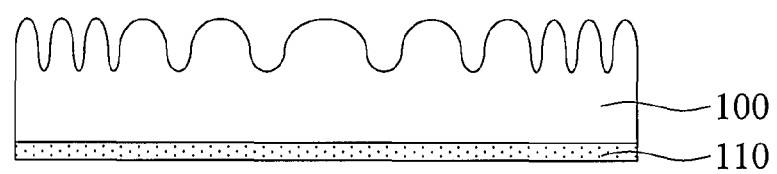

The optical diffusion structure 100 or 100' can be combined with a conventional diffusion plate. FIG. 5a depicts the optical diffusion structure 100 combined with a conventional diffusion plate 50. FIG. 5b is an intensity diagram for the optical diffusion structure 100. As the width of the convex and concave portion 120 and 140 decreases from the center to the lateral sides, a large area of high light intensity is obtained in the center. In addition to the diffusion plate 50, a blurred structure 110 can be formed on the back of the optical diffusion structure 100 to enhance light diffusion as shown in FIG. 5c.

Figure 6A:
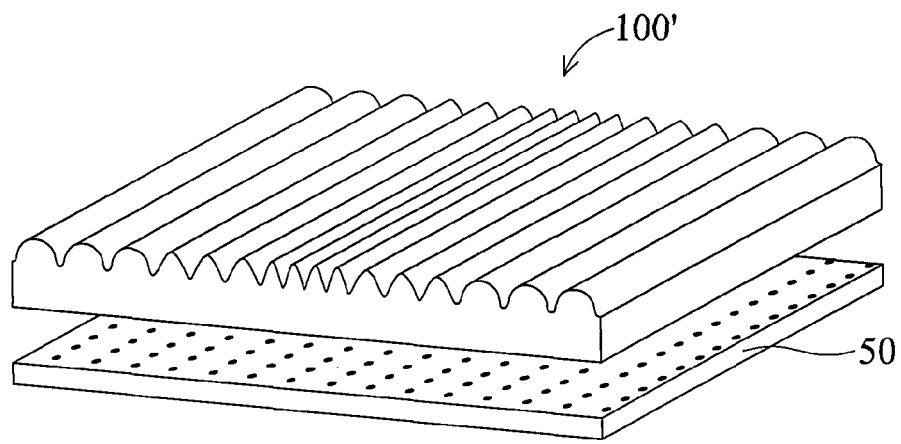
Figure 6B:
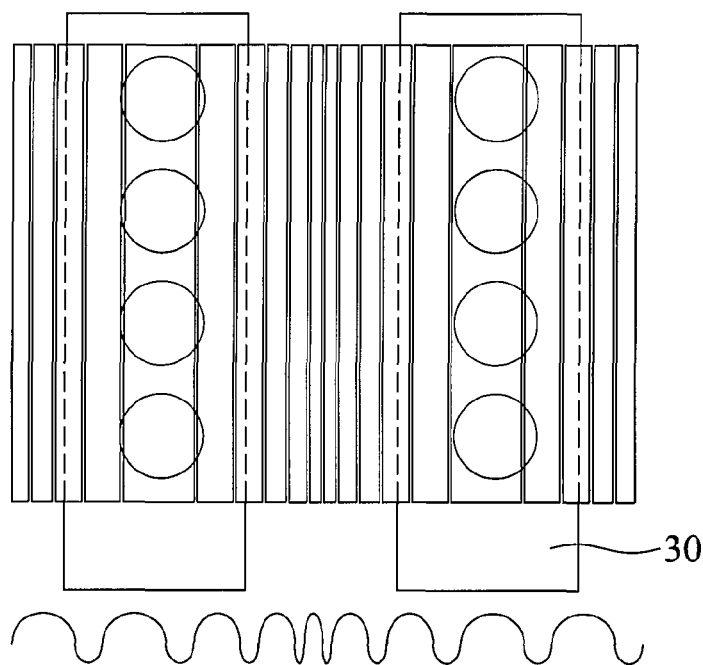
Figure 6C:
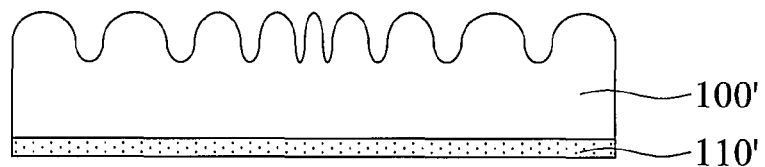

FIG. 6a depicts the optical diffusion structure 100' combined with a conventional diffusion plate 50. FIG. 6b is an intensity diagram for the optical diffusion structure 100'. As the width of the convex and concave portion 120' and 140' increases from the center to the lateral sides, a large area of high light intensity is obtained near the lateral sides. In addition to the diffusion plate 50, a blurred structure 110' can be formed on the back of the optical diffusion structure 100' to enhance light diffusion as shown in FIG. 6c.

The described embodiments can be applied to a two-dimensional optical diffusion structure which is formed by overlapping two or more one-dimensional optical diffusion structures.

Figure 7A:
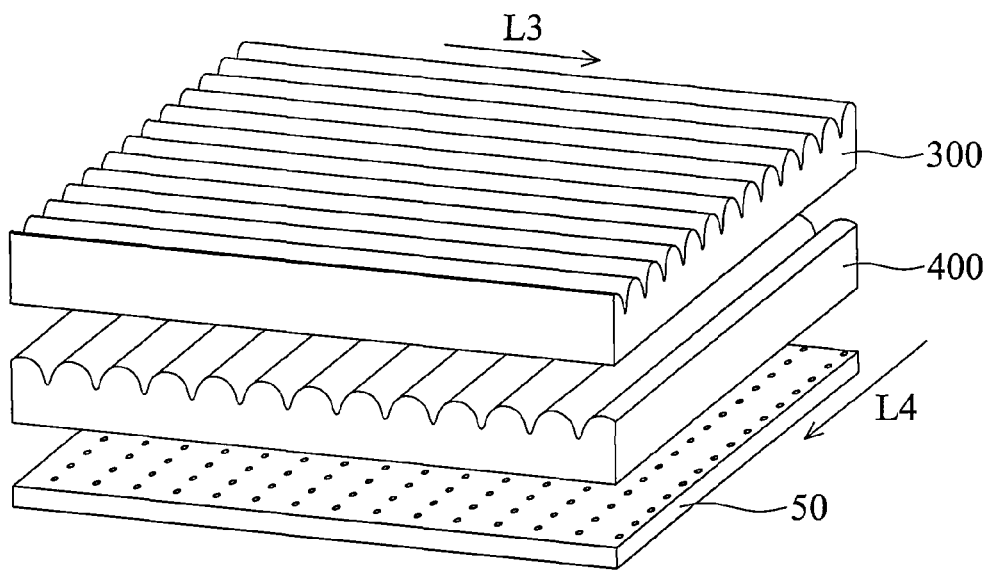
FIG. 7a depicts a combination of two optical diffusion structures.
Figure 7B:
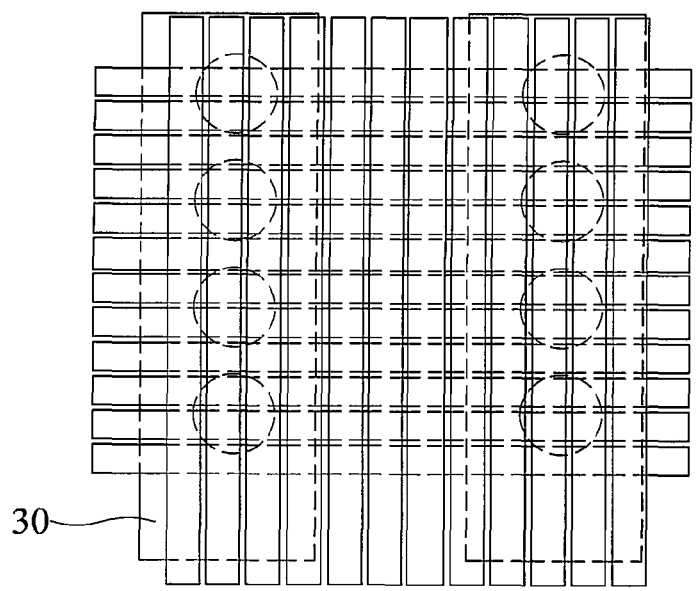
Figure 7C:
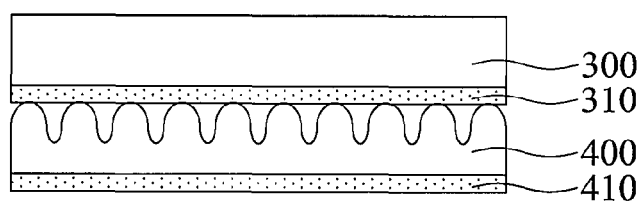

FIG. 7a depicts an embodiment of a two-dimensional structure of the invention. A first diffusion structure 300 and a second diffusion structure 400 are disposed above a diffusion plate 50. Light from a light source passes through the diffusion plate 50, the second diffusion structure 400 and the first diffusion structure 300 sequentially. In this embodiment, the first diffusion structure 300 is the same as the optical diffusion 200 structure shown in FIG. 2a. The second diffusion structure 400 is the same as the optical diffusion 200 structure shown in FIG. 2a. The convex and concave portions of the first diffusion structure 300 extend along a direction L3 (first direction) perpendicular to a direction L4 (third direction) along which the convex and concave portions of the second diffusion structure 400 extend. FIG. 7b is an intensity diagram of light passing through the diffusion plate 50, the second diffusion structure 400 and the first diffusion structure 300. Bright regions shown by the stripes overlap each other, which indicate light diffused in two dimensions. In addition to light diffusion, such a structure can be used to mix light beams with various colors. In addition to the diffusion plate 50, blurred structures 310 and 410 can be formed on the back of the first diffusion structure 300 and the second diffusion structure 400 to enhance light diffusion as shown in FIG. 7c.

Figure 8A:
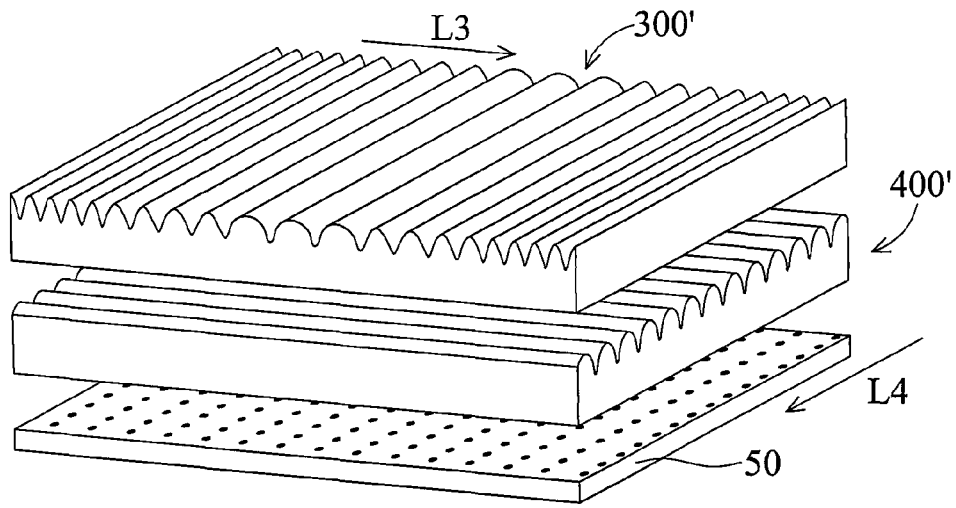
FIG. 8a depicts another combination of two optical diffusion structures.
Figure 8B:
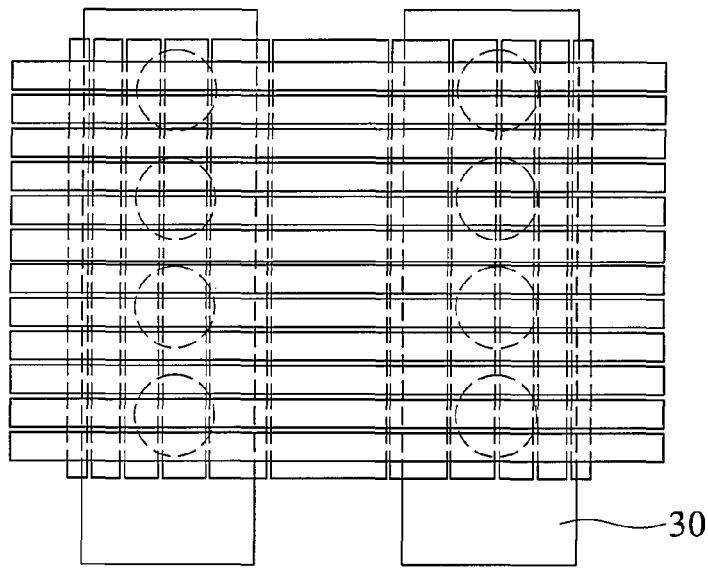
Figure 8C:
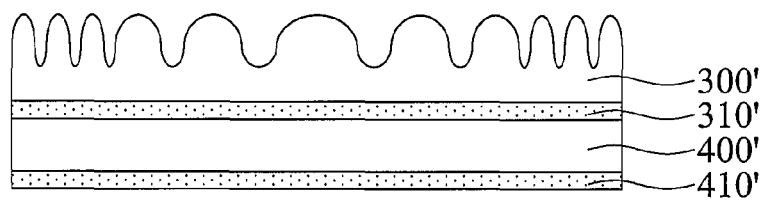

FIG. 8a depicts another embodiment of a two-dimensional structure of the invention. A first diffusion structure 300' and a second diffusion structure 400' are disposed above a diffusion plate 50. In this embodiment, the first diffusion structure 300' is the same as the optical diffusion structure 100 shown in FIG. 3a. The second diffusion structure 400' is the same as the optical diffusion structure 200 shown in FIG. 2a. The convex and concave portions of the first diffusion structure 300' extend along a direction L4 (first direction) perpendicular to a direction L3 (third direction) along which the convex and concave portions of the second diffusion structure 400' extend. As the first diffusion structure 300' condenses light beam to the center and the second diffusion structure 400' spreads light beam uniformly, the optical module shown in FIG. 8a obtains different diffusion result from the optical module shown in FIG. 7a. FIG. 8b is an intensity diagram of light passing through the diffusion plate 50, the second diffusion structure 400' and the first diffusion structure 300'. In addition to the diffusion plate 50, blurred structures 310' and 410' can be formed on the back of the first diffusion structure 300' and the second diffusion structure 400' to enhance light diffusion as shown in FIG. 8c.

Figure 9A:
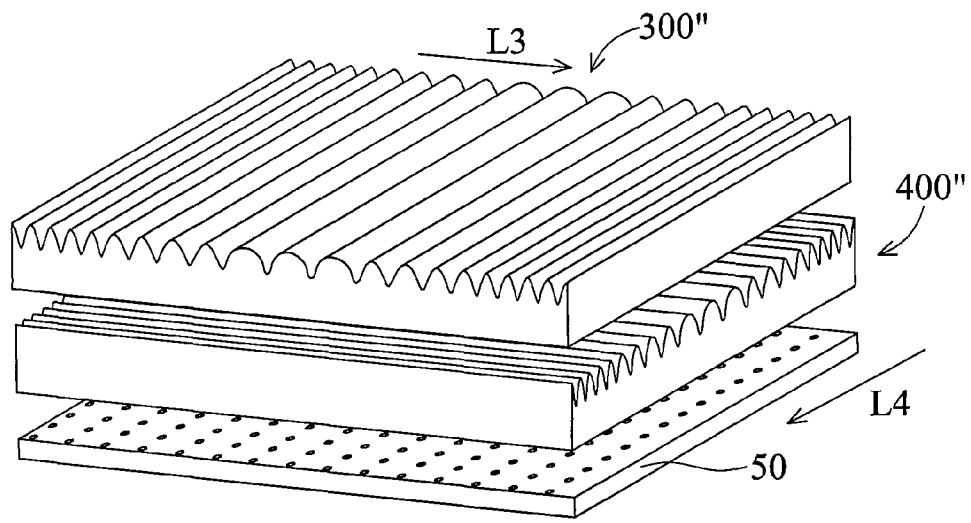
FIG. 9a depicts another combination of two optical diffusion structures.
Figure 9B:
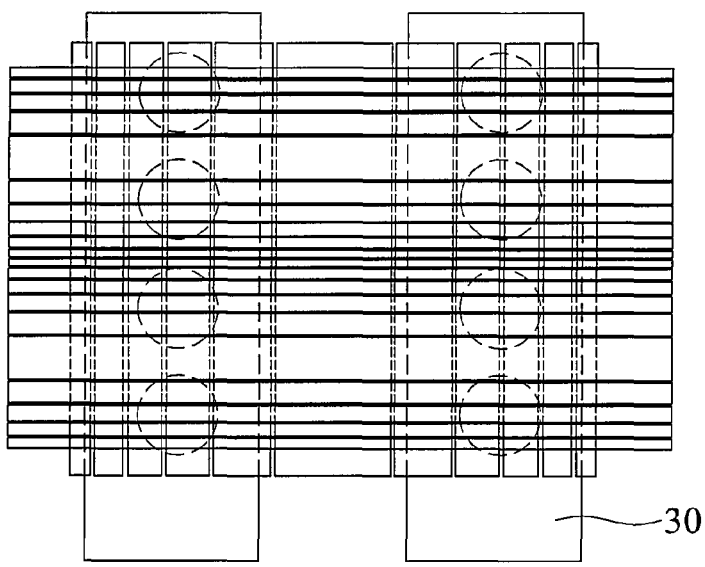
Figure 9C:
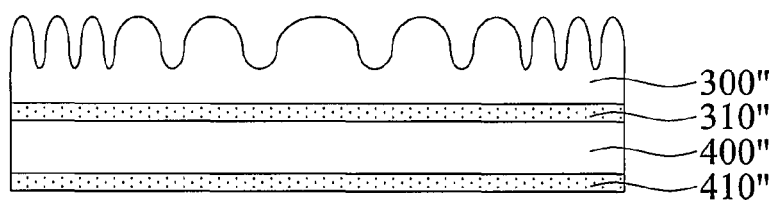

FIG. 9a depicts another embodiment of a two-dimensional structure of the invention. A first diffusion structure 300" and a second diffusion structure 400" are disposed above a diffusion plate 50. In this embodiment, the first diffusion structure 300" is the same as the optical diffusion structure 100 shown in FIG. 3a. The second diffusion structure 400" is the same as the optical diffusion structure 100' shown in FIG. 4a. The convex and concave portions of the first diffusion structure 300" extend along a direction L4 (first direction) perpendicular to a direction L3 (third direction) along which the convex and concave portions of the second diffusion structure 400" extend. FIG. 9b is an intensity diagram of light passing through the diffusion plate 50, the second diffusion structure 400" and the first diffusion structure 300". In addition to the diffusion plate 50, blurred structures 310" and 410" can be formed on the back of the first diffusion structure 300" and the second diffusion structure 400" to enhance light diffusion as shown in FIG. 9c.

Figure 10:
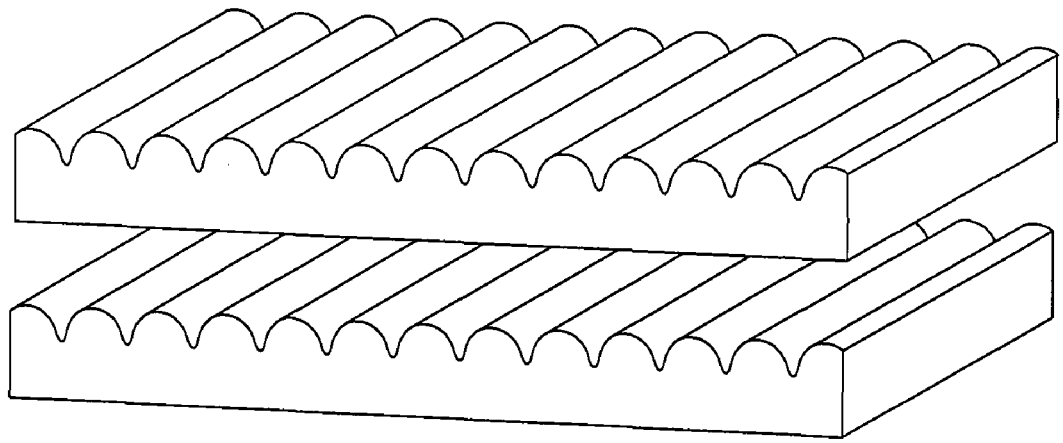
FIG. 10 depicts another combination of two optical diffusion structures.
Figure 11:
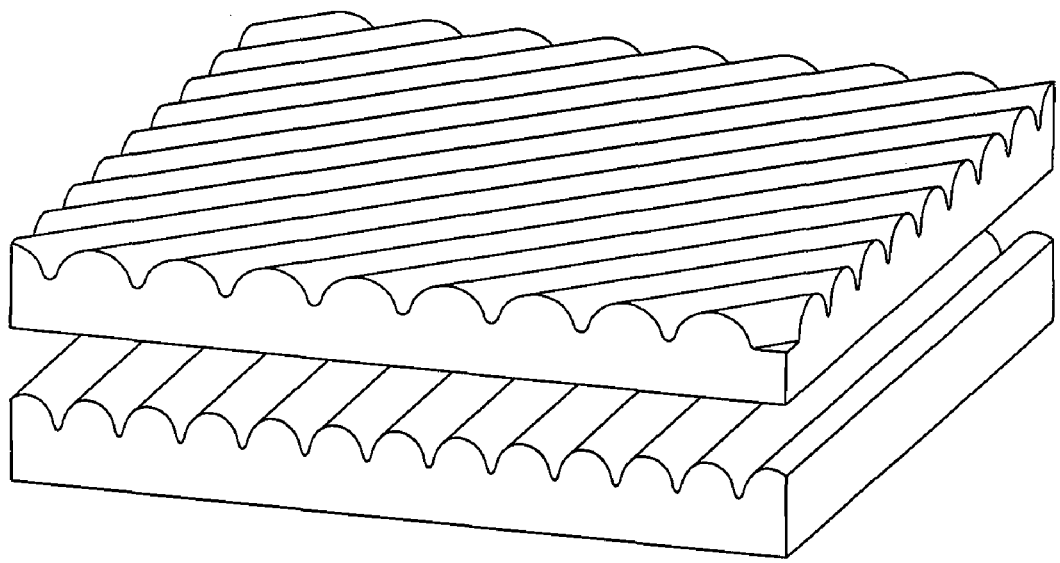
FIG. 11 depicts another combination of two optical diffusion structures.

Although the first diffusion structure extends perpendicular to the second diffusion structure, the invention is not limited thereto. It is possible that the first diffusion structure extends parallel to the second diffusion structure (as shown in FIG. 10) or has an angle of 45° to the second diffusion structure (as shown in FIG. 11).

Figure 12:
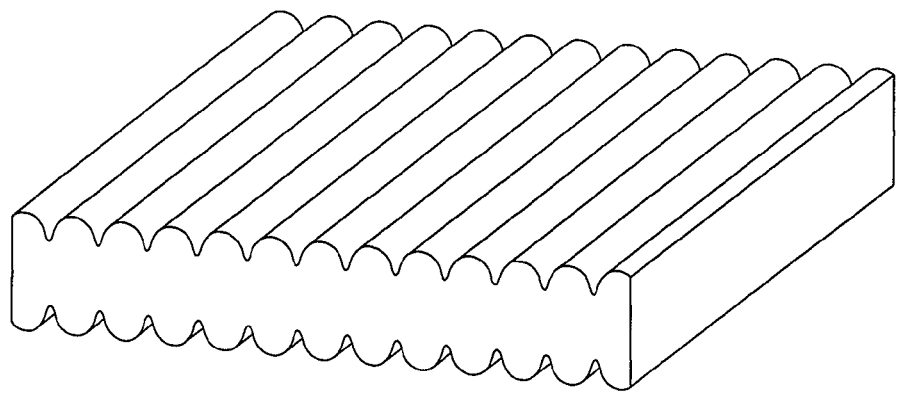
FIG. 12 depicts one optical diffusion plate with two optical diffusion structures.
Figure 13:
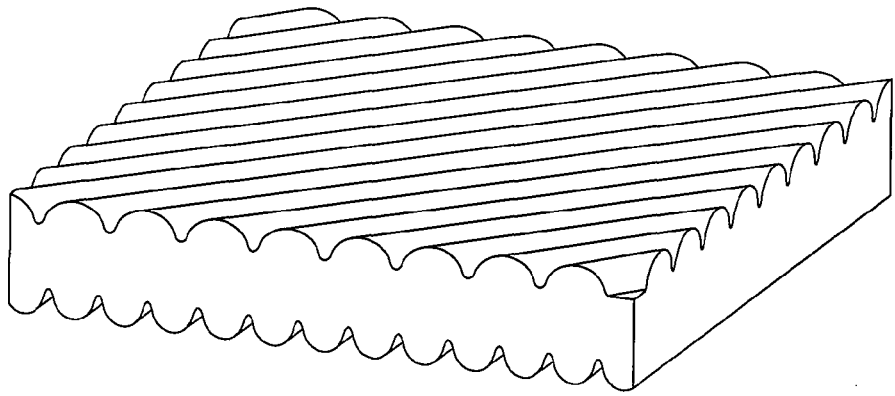
FIG. 13 depicts one optical diffusion plate with two optical diffusion structures.
Figure 14:
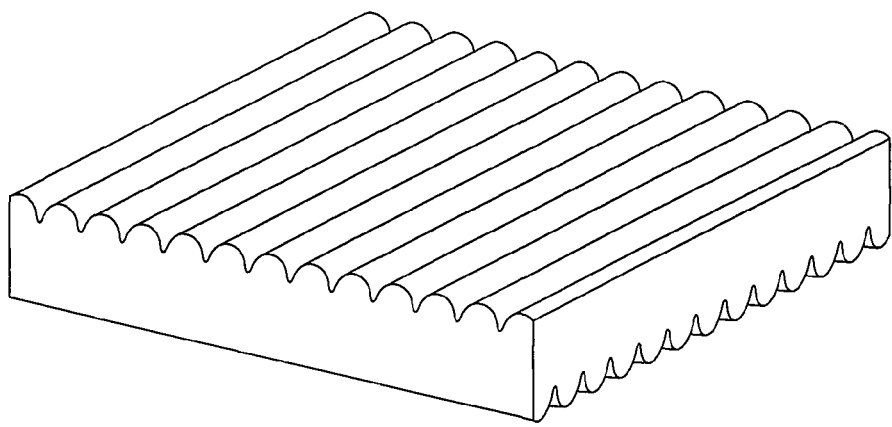
FIG. 14 depicts one optical diffusion plate with two optical diffusion structures.

The two-dimensional optical diffusion structure of the described embodiment is formed by overlapping two one-dimensional optical diffusion structures formed on two substrates. It is possible to form two one-dimensional optical diffusion structures on opposite sides of a substrate as shown in FIGS. 12, 13 and 14. In FIG. 12, the extending directions of the one-dimensional optical diffusion structures are parallel. In FIG. 13, the extending directions of the one-dimensional optical diffusion structures are angled by 45°. In FIG. 14, the extending directions of the one-dimensional optical diffusion structures are perpendicular.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical diffusion module, comprising:
   a first diffusion structure comprising a plurality of convex portions and a plurality of concave portions arranged alternatingly, each adjacent convex portion and concave portion joined at a junction, wherein the junction is an inflection point of a curve defined by said adjacent convex portion and concave portion; and
   a second diffusion structure comprising a plurality of convex portions and a plurality of concave portions arranged alternatingly, each adjacent convex portion and concave portion joined at a junction, wherein the junction is an inflection point of a curve defined by said adjacent convex portion and concave portion;
   wherein the first diffusion structure and the second diffusion structure are arranged such that light from a light source passes through the first diffusion structure and the second diffusion structure sequentially,
   wherein the convex portions and the concave portions of the first diffusion structure are continuous and smooth, and the convex portions and the concave portions of the second diffusion structure are continuous and smooth, and
   wherein the convex portions of the first diffusion structure and the second diffusion structure, the concave portions of the first diffusion structure and the second diffusion structure, the junctions of the convex and concave portions of the first diffusion structure, and the junctions of the convex and concave portions of the second diffusion structure have a curvature different from 0.

2. The optical diffusion module as claimed in claim 1 further comprising a first diffusion sheet on which the first diffusion structure is formed and a second diffusion sheet on which the second diffusion structure is formed.

3. The optical diffusion module as claimed in claim 2, wherein the first diffusion sheet comprises a first blurred layer opposite the first diffusion structure.

4. The optical diffusion module as claimed in claim 3, wherein the second diffusion sheet comprises a second blurred layer opposite the second diffusion structure.

5. The optical diffusion module as claimed in claim 1 further comprising a diffusion plate having a first surface and a second surface opposite the first surface, wherein the first diffusion structure is formed on the first surface, and the second diffusion structure is formed on the second surface.

6. The optical diffusion module as claimed in claim 1, wherein the convex and concave portions of the first diffusion structure extend along a first direction and are arranged alternatingly along a second direction, and the convex and concave portions of the second diffusion structure extend along a third direction and are arranged alternatingly along a fourth direction, and an angle is formed between the first direction and the third direction.

7. The optical diffusion module as claimed in claim 6, wherein the angle is greater than 0° and less than 90°.

8. The optical diffusion module as claimed in claim 6, wherein each convex portion of the first diffusion structure is curved and has a first curved surface having a first width along the second direction, which is varied along the second direction.

9. The optical diffusion module as claimed in claim 8, wherein each concave portion of the first diffusion structure is curved and has a second curved surface having a second width along the second direction, which is varied along the second direction.

10. The optical diffusion module as claimed in claim 9, wherein the first width decreases from a center to lateral sides of the first diffusion structure.

11. The optical diffusion module as claimed in claim 10, wherein the second width decreases from a center to lateral sides of the first diffusion structure.

12. The optical diffusion module as claimed in claim 9, wherein the first width increases from a center to lateral sides of the first diffusion structure.

13. The optical diffusion module as claimed in claim 12, wherein the second width increases from a center to lateral sides of the first diffusion structure.

14. The optical diffusion module as claimed in claim 8, wherein each convex portion of the second diffusion structure is curved and has a third curved surface having a third width in the fourth direction, which is varied along the fourth direction.

15. The optical diffusion module as claimed in claim 9, wherein each convex portion of the second diffusion structure is curved and has a third curved surface having a third width in the fourth direction, which is varied along the fourth direction.

16. The optical diffusion module as claimed in claim 15, wherein each concave portion of the second diffusion structure is curved and has a fourth curved surface having a fourth width in the fourth direction, which is varied along the fourth direction.

17. The optical diffusion module as claimed in claim 16, wherein the third width decreases from a center to lateral sides of the second diffusion structure.

18. The optical diffusion module as claimed in claim 17, wherein the fourth width decreases from a center to lateral sides of the second diffusion structure.

19. The optical diffusion module as claimed in claim 16, wherein the third width increases from a center to lateral sides of the second diffusion structure.

20. The optical diffusion module as claimed in claim 19, wherein the fourth width increases from a center to lateral sides of the second diffusion structure.

21. The optical diffusion module as claimed in claim 1 further comprising a diffusion layer, wherein the light from the light source passes through the diffusion layer, the first diffusion structure and the second diffusion structure sequentially.

* * * * *